United States Patent
Amano et al.

(10) Patent No.: US 7,479,534 B2
(45) Date of Patent: Jan. 20, 2009

(54) ONE-COMPONENT EPOXY RESIN COMPOSITION

(75) Inventors: Hiroshi Amano, Kawasaki (JP); Osamu Yamabe, Kawasaki (KR); Hiroyasu Koto, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 62 days.

(21) Appl. No.: 11/491,118

(22) Filed: Jul. 24, 2006

(65) Prior Publication Data

US 2007/0021582 A1   Jan. 25, 2007

Related U.S. Application Data

(63) Continuation of application No. PCT/JP2005/001156, filed on Jan. 21, 2005.

(30) Foreign Application Priority Data

Jan. 22, 2004   (JP)   ............... 2004-014995

(51) Int. Cl.
    *C08G 59/66* (2006.01)
(52) U.S. Cl. ........................ 528/109; 528/91
(58) Field of Classification Search ................. 528/109, 528/91
    See application file for complete search history.

(56) References Cited

U.S. PATENT DOCUMENTS

| | | | |
|---|---|---|---|
| 5,430,112 A | 7/1995 | Sakata et al. | |
| 6,232,426 B1 | 5/2001 | Orikabe et al. | |
| 6,660,394 B1 * | 12/2003 | Ishizuki et al. | ............... 428/447 |
| 2004/0005363 A1 * | 1/2004 | Tsukada et al. | ............... 424/537 |
| 2007/0021582 A1 | 1/2007 | Amano et al. | |

FOREIGN PATENT DOCUMENTS

| | | |
|---|---|---|
| EP | 0 594 133 | 5/1998 |
| EP | 0 942 028 | 9/1999 |
| JP | 60-21648 | 5/1985 |
| JP | 61-159417 | 7/1986 |
| JP | 6-211970 | 8/1994 |
| JP | 7-196776 | 8/1995 |
| JP | 11-256013 | 9/1999 |
| JP | 2000-230112 | 8/2000 |
| JP | 2002-030112 | 1/2002 |
| JP | 2002-284852 | 10/2002 |
| JP | 2003-96061 | 4/2003 |

OTHER PUBLICATIONS

Freis, R.E.; Grimm, R.A.; McKillip,W.J. "Aminimides XII Long Chain Aminimides and Isocyanates" Journal of the American Oil Chemists' Society. vol. 49, No. 2 Feb. 1972. pp. 111-114.*
"General Epoxy Resins", edited by Epoxy Resin Technology Association, published Nov. 19, 2003, pp. 186-197.
Akatsuka, M., et al., "Influences of Inorganic Filters on Curing Reactions of Epoxy Resins Initiated with a Boron Trifluoride Amine Complex," Polymer 42, 2002, pp. 3003-3007.
U.S. Appl. No. 12/180,115, filed Jul. 25, 2008, Amano, et al.

* cited by examiner

*Primary Examiner*—Mark Eashoo
*Assistant Examiner*—Megan McCulley
(74) *Attorney, Agent, or Firm*—Oblon, Spivak, McClelland, Maier & Neustadt, P.C.

(57) ABSTRACT

The present application relates to a one-component epoxy resin composition that contains an epoxy resin containing: (1) an epoxy resin having 2 or more epoxy groups in the molecule, (2) a polythiol compound having 2 or more thiol groups in the molecule, (3) a compound that releases a basic component under a curing temperature condition and dissolves in constituent (2), and (4) a compound having Lewis acidity. The present invention also relates to a method of producing the same.

29 Claims, No Drawings

ONE-COMPONENT EPOXY RESIN COMPOSITION

CROSS-REFERENCE TO RELATED APPLICATIONS

The present application is a continuation of PCT/JP2005/001156, filed on Jan. 21, 2005, which claims priority to JP 014995/2004, filed on Jan. 22, 2004, the entire contents of these applications is incorporated herein by reference.

BACKGROUND OF THE INVENTION

1. Field of the Invention

The present invention provides a completely liquid one-component epoxy resin composition having excellent curing properties and excellent storage stability. The present invention further provides an adhesion method using the one-component epoxy resin composition.

2. Discussion of the Background

Epoxy resin compositions are utilized in a wide field such as adhesives, sealants, paints and the like. Generally, the epoxy resin compositions in wide-spread us is a two-component epoxy resin system, wherein the epoxy resin composition and the catalyst composition containing a curing agent are separately maintained until the time of which curing is desired wherein the two compositions are mixed. However, the systems are frequently tied to poor workability, such as requiring a mixing operation of a base resin and a curing agent ("General Epoxy Resins", edited by Epoxy Resin Technology Association, published Nov. 19, 2003).

Accordingly, a one-component epoxy resin composition (or system) having excellent workability not requiring a mixing operation of a base resin and a curing agent has been used in the art of this field. One-component epoxy systems is one in which all constituents are mixed together and where crosslinking of the epoxide groups with other reactive materials (e.g., amines, alcohols, phenols, carboxylic acids, and unsaturated compounds) is initiated by, for example, exposure to air, UV light irradiation, altered temperatures (increased or decreased from ambient temperature), or altered moisture content.

Many latent curing agents used in a one-component epoxy resin composition are particles of several μm, and are used by dispersing in a liquid epoxy resin. The latent curing agents are those that are in a form that does not react with the epoxy resin at ordinary or ambient temperature, and therefore do not react while in admixture with the epoxy resin. With subsequent heating, the latent curing agents induce a curing reaction with the epoxy resin. This form of curing agent is referred to as a solid dispersion latent curing agent. Examples of this type of latent curing agent include dicyandiamide, a dihydrazide compound and an amine adduct compound, or enmicrocapsulated amine or imidazole (the above described "General Epoxy Resins", edited by Epoxy Resin Technology Association, published Nov. 19, 2003).

However, in an impregnating adhesive composition containing a solid dispersion latent curing agent, only a liquid epoxy resin penetrates deeply; however, particles of the curing agent do not sufficiently infiltrate between spaces. Therefore, there are problems that curing occurs heterogeneously, and in an extreme case, the space part does not cure at all. Further, in paint and/or coating materials containing a resin composition using a solid dispersion latent curing agent, the curing agent and the epoxy resin cannot uniformly be mixed when curing in a portion having an extremely small coating thickness. Therefore, disadvantageously the cured film becomes heterogeneous, and partially uncured areas form.

To solve the aforementioned problems, a completely liquid one-component epoxy resin composition in which a curing agent is dissolved and an epoxy resin is present was desired. As the completely liquid epoxy resin composition known heretofore, a composition containing an amine complex of boron trifluoride as a curing agent is known, but this composition generates a corrosive hydrogen fluoride gas when curing, and therefore, its use was extremely limited (M. Akatsuka, et al., Polymer, Vol. 42, 3003 p (2001)).

Further, a one-component epoxy resin composition using an onium salt, such as a sulfonium salt, and a pyridinium salt as a curing agent is known. However, there are problems with this curing agent as it causes a cationic polymerization resulting in poor adhesive force. In addition, with this curing agent there are many limitations on additives that can be added to the composition (the above described "General Epoxy Resins", edited by Epoxy Resin Technology Association, published Nov. 19, 2003).

Further, an example of a one-component epoxy resin composition utilizing an amineimide compound as a curing agent is known. However, with this composition there are problems that the curing rate is markedly slow, and to obtain practical adhesive strength, severe curing conditions of 150° C. and 3 hours are required (JP-A-2003-96061).

On the other hand, a composition containing a bifunctional or polyfunctional epoxy compound, a trifunctional or polyfunctional polythiol compound and an amine is known. Because this composition does not use a solid dispersion curing agent or a curing accelerator, impregnating adhesion or thin film curing is possible. However, this composition has poor storage stability at ordinary temperature and could not withstand practical production (JP-B-60-21648).

A composition containing a polyfunctional epoxy compound, a polyfunctional thiol, an amine and a mercapto organic acid as a curing retarder is also known, but the curing properties of this composition are insufficient for practical use (JP-A-61-159417).

Further, has been disclosed that a one-component epoxy system having good storage stability and excellent curing properties can be prepared by using a polythiol compound having two or more thiol groups in the molecule as a curing agent, using a reaction product between a compound having one or more isocyanate group in the molecule as a curing accelerator and a compound having at least one primary and/or secondary amino group in the molecule, and a polythiol series epoxy resin (U.S. Pat. No. 3,367,532). However, when the invention disclosed therein was traced, undissolved residue remained in the composition, and it was not always said to be a practical composition having excellent reproducibility.

On the other hand, an epoxy resin composition comprising (1) an epoxy resin having 2 or more epoxy groups in the molecule, (2) a thiol compound having 2 or more thiol groups in the molecule, (3) a solid dispersion latent curing accelerator, and (4) a boric acid ester compound, as essential components was known (JP-A-11-256013). However, in this epoxy resin composition, the boric acid ester compound added to further improve its storage stability was limited to an extremely specific use method limited to the case that a curing accelerator is solid dispersion type, as described that "it is considered that the compound reacts with a surface of a solid dispersion latent curing accelerator to modify the same, resulting in encapsulation (see the above patent publication, [0025] first part).

In view of the foregoing, there remains a critical need for a completely liquid epoxy resin composition having storage stability capable of withstanding practical production steps, and also withstanding general distribution. Such a composition would also need to provide sufficient curing and adhesive properties.

SUMMARY OF THE INVENTION

It is an object of the present invention to provide a one-component epoxy resin composition in which an epoxy resin and a curing agent are uniformly mixed, having greatly improved, sufficient storage stability, and having excellent curing properties, and also to provide a method of enabling impregnating adhesion or thin film curing by this composition.

As a result of extensive investigations to solve the above problems, the present inventors have found that the above objects can be achieved by an epoxy resin composition containing:

(1) an epoxy resin having 2 or more epoxy groups in the molecule,
(2) a polythiol compound having 2 or more thiol groups in the molecule,
(3) a compound that releases a basic component under a curing temperature condition and dissolves in constituent (2), and
(4) a compound having Lewis acidity.

Accordingly, the present invention provides the following:

[1] A one-component epoxy resin composition, comprising:

(1) an epoxy resin having 2 or more epoxy groups in the molecule,
(2) a polythiol compound having 2 or more thiol groups in the molecule,
(3) a compound that releases a basic component under a curing temperature condition and dissolves in constituent (2), and
(4) a compound having Lewis acidity.

[2] The one-component epoxy resin composition of [1], wherein constituent (3) is a urea compound.

[3] The one-component epoxy resin composition of [2], wherein the urea compound is a compound obtained by a reaction of a compound having one or more isocyanate group in the molecule and a compound having at least one primary and/or secondary amino group in the molecule

[4] The one-component epoxy resin composition of [1], wherein constituent (3) is an amineimide compound.

[5] The one-component epoxy resin composition of [4], wherein the amineimide compound is a compound represented by the structure of formula (1):

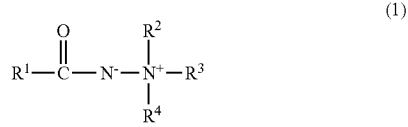

wherein $R^1$ represents an alkyl group which may have one or more substituents or an aryl group which may have one or more substituents, and $R^2$, $R^3$ and $R^4$ each independently represent an alkyl group which may have one or more substituents.

[6] The one-component epoxy resin composition of [1], wherein constituent (3) is present in an amount ranging from 0.5 to 30 parts by weight per 100 parts by weight of the constituent (1).

[7] The one-component epoxy resin composition of [1], wherein constituent (4) is a boric acid ester.

[8] The one-component epoxy resin composition of [7], wherein said boric acid ester is selected from the group consisting of trimethyl borate, triethyl borate, tri-n-propyl borate, triisopropyl borate and tri-n-butyl borate.

[9] The one-component epoxy resin composition of [1], wherein constituent (4) is a titanic acid ester compound.

[10] The one-component epoxy resin composition of [9], wherein said titanic acid ester is selected from the group consisting of tetraethyl titanate, tetrapropyl titanate and tetraisopropyl titanate.

[11] The one-component epoxy resin composition of [1], wherein constituent (4) is present in an amount ranging from 0.3 to 2.0 parts by weight per 100 parts by weight of the constituent (1).

[12] The one-component epoxy resin composition of [1], constituent (1) is selected from the group consisting of polyglycidyl ethers, glycidyl ether esters, polyglycidyl esters, epoxidized phenol novolac resins, epoxidized cresol novolac resins, epoxidized polyolefins, alicyclic epoxy resins, and urethane-modified epoxy resins.

[13] The one-component epoxy resin composition of [1], constituent (1) is a bisphenol-A type epoxy resin.

[14] The one-component epoxy resin composition of [1], wherein the mixing ratio of constituent (1) and constituent (2) ranges from 0.2 to 1.2 in SH equivalent number/epoxy equivalent number.

[15] An epoxy resin cured product, obtained by heating the one-component epoxy resin composition of [1].

[16] A functional product, comprising the one-component epoxy resin composition of [1] as a main component.

[17] A method of producing the one-component epoxy resin composition of [1], comprising:
mixing constituent (3) with constituent (2),
heat dissolving the mixture of constituent (3) and constituent (2) until a uniform solution is formed;
cooling the uniform solution;
adding constituent (4) and constituent (1); and
mixing.

[18] The method of [17], wherein constituent (3) is a urea compound and said heat dissolving is at a temperature ranging from 40° C. to 150° C.

[19] The method of [17], wherein constituent (3) is an amineimide compound and said heat dissolving is at a temperature ranging from 20° C. to 150° C.

[20] The method of [17], wherein said heat dissolving is for 5 minutes to 5 hours.

The above objects highlight certain aspects of the invention. Additional objects, aspects and embodiments of the invention are found in the following detailed description of the invention.

DETAILED DESCRIPTION OF THE INVENTION

Unless specifically defined, all technical and scientific terms used herein have the same meaning as commonly understood by a skilled artisan in chemistry, adhesives, and materials science.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention provides a one-component epoxy resin composition of the invention can provide a completely uniform, transparent cured product having sufficient curing performance and storage stability capable of withstanding practical production and use. With the present invention adhesion of narrow spaces, to which conventionally only the conventional two-component epoxy resin composition could be used, the one-component epoxy resin composition of the present invention can now find use with a great improvement in workability. Further, the inventive composition also finds utility in paints where a uniform and transparent thin film can stably produced.

As stated above, the present invention provides a one-component epoxy system/composition containing:
  (1) an epoxy resin having 2 or more epoxy groups in the molecule,
  (2) a polythiol compound having 2 or more thiol groups in the molecule,
  (3) a compound that releases a basic component under a curing temperature condition and dissolves in constituent (2), and
  (4) a compound having Lewis acidity.

The epoxy resin having 2 or more epoxy groups in the molecule for use as constituent (1) may be one if only it has 2 or more epoxy groups per one molecule on the average. Examples of suitable epoxy resins include, polyglycidyl ethers obtained by reacting polyhydric phenols such as bisphenol-A, bisphenol-F, bisphenol-AD, catechol and resorcinol, or polyhydric alcohols such as glycerin and polyethylene glycol, with epichlorohydrin; glycidyl ether esters obtained by reacting hydroxycarboxylic acid such as p-hydroxybenzoic acid and β-hydroxynaphthoic acid, with epichlorohydrin; polyglycidyl esters obtained by reacting polycarboxylic acid such as phthalic acid and terephthalic acid, with epichlorohydrin; epoxidized phenol novolac resins; epoxidized cresol novolac resins; epoxidized polyolefins; alicyclic epoxy resins; urethane-modified epoxy resins; and the like. Of those epoxy resins, bisphenol-A type epoxy resins are preferable from the standpoint of general versatility.

The polythiol compound for use as constituent (2) may be, for example, thiol compounds having 2 or more thiol groups in the molecule, requiring or not requiring use of a basic substance on the production step.

Examples of thiol compounds having 2 or more thiol groups in the molecule not requiring use of a basic substance on the production step include: thiol compounds obtained by esterification reaction of polyols such as trimethylolpropane tris(thioglycolate), pentaerythritol tetrakis(thioglycolate), ethylene glycol dithioglycolate, trimethylolpropane tris(β-thiopropionate), pentaerythritol tetrakis(β-thiopropionate) and dipentaerythritol poly(β-thiopropionate), and a mercaptoorganic acid.

Further, thiol compounds having 2 or more thiol groups in the molecule requiring the use of a basic substance as a reaction catalyst in its production step includes the following examples: alkyl polythiol compounds such as 1,4-butanedithiol, 1,6-hexanedithiol and 1,10-decanedithiol; terminal thiol group-containing polyethers; terminal thiol group-containing polythioethers; thiol compounds obtained by reaction of an epoxy compound and hydrogen sulfide; and thiol compounds having terminal thiol group, obtained by reaction of a polythiol compound and an epoxy compound, thiol compounds having 2 or more thiol groups in the molecule, in which an alkali metal ion concentration was made to be 50 ppm or less by conducting dealkalization treatment.

As the dealkalization treatment of the polythiol compounds produced using a basic substance as a reaction catalyst, for example, in an embodiment of the present invention is a method of dissolving a polythiol compound to be treated in an organic solvent such as acetone and methanol, adding an acid such as dilute hydrochloric acid and dilute sulfuric acid to neutralize, and removing salts formed, by extraction, washing or the like. Alternative embodiments include a method of adsorption removing using an ion-exchanged resin and a method of separation purifying a polythiol compound by distillation.

The mixing ratio of constituent (1) and constituent (2) can generally be from 0.2 to 1.2 in SH equivalent number/epoxy equivalent number. When less than 0.2, sufficient fast curing properties are not obtained. On the other hand, when more than 1.2, properties of a cured product, such as heat resistance, are impaired. Within the aforementioned range, a ratio of from 0.5 to 1.0 is preferable from the perspective of adhesiveness stability.

The constituent (3) used in the resin composition of the invention is a precursor of a curing accelerator, and its structure is not particularly limited so long as it is a compound that releases a basic component under a curing temperature condition, and dissolves in constituent (2). The basic constituent intended herein is a compound having ability to withdraw Hydrogen cation out of a thiol group in constituent (2). Further, constituent (3) may not always dissolve in constituent (1) if only it dissolves in the constituent (2), and it is acceptable if only constituent (3) uniformly dissolves in a mixture of constituent (1) and constituent (2). Examples of suitable constituent (3) include, a urea compound, an amineimide compound and the like.

In an embodiment of the present invention the urea compound is a compound obtained by the reaction of a compound having one or more isocyanate group in the molecule and a compound having at least one primary and/or secondary amino group in the molecule. This urea compound can be obtained by reacting the isocyanate and the compound having primary and/or secondary amino group in an organic solvent such as toluene and dichloromethane.

The compound having one or more isocyanate group in the molecule, includes the following examples: n-butyl isocyanate, isopropyl isocyanate, 2-chloroethyl isocyanate, phenyl isocyanate, p-bromophenyl isocyanate, m-chlorophenyl isocyanate, o-chlorophenyl isocyanate, p-chlorophenyl isocyanate, 2,5-dichlorophenyl isocyanate, 3,4-dichlorophenyl isocyanate, 2,6-dimethylphenyl isocyanate, o-fluorophenyl isocyanate, p-fluorophenyl isocyanate, m-tolyl isocyanate, p-tolyl isocyanate, o-trifluoromethylphenyl isocyanate, m-trifluoromethylphenyl isocyanate, benzyl isocyanate, hexamethylene diisocyanate, 2,4-toluylene diisocyanate, 2,6-toluylene diisocyanate, 1,5-naphthalene diisocyanate, diphenylmethane-4,4'-diisocyanate, 2,2-dimethyldiphenylmethane-4,4'-diisocyanate, tolidine diisocyanate, isophorone diisocyanate, xylylene diisocyanate, 1,3-bis(isocyanatomethyl)cyclohexane, p-phenylene diisocyanate, 1,3,6-hexamethylene triisocyanate, bicycloheptane triisocyanate, tris-(3-isocyanato-4-methylphenyl)isocyanurate, tris-(6-isocyanatohexyl)isocyanurate, and the like. However, the compound is not limited to the foregoing examples so long as a reaction product with the compound having at least one primary and/or secondary amino group in the molecule is satisfied with the solubility described above. Of the foregoing examples, an aromatic isocyanate is preferable from the standpoint that solubility of a reaction product with amine is particularly excellent. Within the scope of aromatic isocyanates, phenyl isocyanate, 2,4-toluylene diisocyanate, 2,6-toluylene diisocyanate and diphenylmethane-4,4'-diisocyanate are more preferable, with phenyl isocyanate and 2,4-toluylene diisocyanate being particularly preferable.

The compound having at least one primary and/or secondary amino group in the molecule, includes the following examples: dimethylamine, diethylamine, di-n-propylamine, di-n-butylamine, di-n-hexylamine, di-n-octylamine, di-n-ethanolamine, dimethylaminopropylamine, diethylaminopropylamine, morpholine, piperidine, 2,6-dimethylpiperidine, 2,2,6,6-tetramethylpiperidine, piperadine, pyrrolidine, benzylamine, N-methylbenzylamine, cyclohexylamine, metaxylenediamine, 1,3-bis(aminomethyl)cyclohexane, isophoronediamine and the like. Of the foregoing, secondary amines are preferable from the point of particularly reactivity and solubility. Secondary amines having a structure that a substituent containing 2 or more carbon atoms is bonded to nitrogen atom, and secondary amines having a cyclic structure are preferable from the standpoint that solubility is excellent. Particular secondary amines that are preferred include: diethylamine, diisopropylamine, dibutylamine, piperidine and pyrrolidine are more preferable, piperidine and pyrrolidine are further more preferable, with pyrrolidine being particularly preferable.

The amineimide compound is a compound represented by the structure of formula (1):

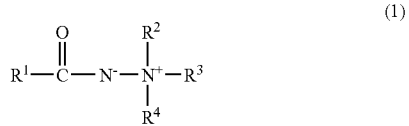

(1)

In formula (1), $R^1$ represents an alkyl group which may have one or more substituents or an aryl group which may have one or more substituents, wherein said alkyl group or said aryl group has 1 to 18 carbon atoms, more preferably 1 to 6 carbon atoms. In formula (1), $R^2$, $R^3$ and $R^4$ each independently represent an alkyl group which may have one or more substituents, wherein said alkyl group has 1 to 3 carbon atoms and wherein $R^2$ and $R^3$ may be bridged by an alkylene group having 4 to 6 carbon atoms. Examples of substituents in $R^1$, $R^2$, $R^3$ and $R^4$ include a hydroxyl group, an alkyl ether group having 1 to 18 carbon atoms (preferably 1 to 8 carbon atoms), an aryl ether group having 1 to 18 carbon atoms (preferably 6 to 10 carbon atoms), an aryl group having 1 to 18 carbon atoms (preferably 6 to 10 carbon atoms), an alkenyl ether group having 2 to 18 carbon atoms (preferably 2 to 4 carbon atoms) and the like, wherein the substituents are independently selected.

Such an amineimide compound may be obtained by conventional methods including that disclosed in, for example, J. Appl. Polym. Sci., 27, 2361 (1982), JP-B-50-9035, JP-B-50-9038, JP-B-55-50050 or JP-A-2000-229927. A representative method is a method of obtaining the compound by reacting carboxylic esters with an asymmetric dialkyl hydrazine, and further reacting with an epoxy compound.

The carboxylic ester includes, for example, alkyl esters of aliphatic monobasic acid or polybasic acid, such as acetic acid, propionic acid, stearic acid, succinic acid and adipic acid, and alkyl esters of aromatic monobasic acid or polybasic acid, such as benzoic acid, phthalic acid and terephthalic acid. A preferred carboxylic ester from the standpoints of reactivity and solubility is methyl 2-hydroxycarboxylate.

The asymmetric hydrazine includes, for example, 1,1-dialkylhydrazines such as 1,1-dimethylhydrazine and 1,1-diethylhydrazine; cyclic hydrazines such as N-aminopyrrolidine and N-aminopiperidine. From the point of general versatility, 1,1-dimethylhydrazine is preferable.

The epoxy compound includes, for example, alkylene oxides such as propylene oxide and styrene oxide, glycidyl ethers such as butylglycidyl ether, 2-ethylhexyl glycidyl ether and phenylglycidyl ether. From the standpoints of general versatility and safety, phenylglycidyl ether is preferable.

The addition amount of the constituent (3) is 0.5 to 30 parts by weight per 100 parts by weight of the constituent (1) in the composition. When less than 0.5 parts by weight is used, there is the case that sufficient curing properties are not obtained, and when more than 30 parts by weight is used, storage stability is impaired. With the range of constituent (3), 0.7 to 20 parts by weight is preferable, and 1.0 to 10 parts by weight is further preferable, from the standpoint that curing properties, solubility and high storage stability.

Constituent (4) of the invention is a compound having Lewis acidity, and is added to improve storage stability. Examples of suitable compounds having Lewis acidity include: titanic acid ester compounds, boric acid ester compounds, aluminate compounds, zirconate compounds.

Representative examples of the boric acid ester compound include: trimethyl borate, triethyl borate, tri-n-propyl borate, triisopropyl borate, tri-n-butyl borate, tripentyl borate, triallyl borate, trihexyl borate, tricyclohexyl borate, trioctyl borate, trinonyl borate, tridecyl borate, tridodecyl borate, trihexadecyl borate, trioctadecyl borate, tris(2-ethylhexyloxy)borane, bis(1,4,7,10-tetraoxaundecyl)(1,4,7,10,13-pentaoxatetradecyl)(1,4,7-trioxaundecyl)borane, tribenzyl borate, triphenyl borate, tri-o-tolyl borate, tri-m-tolyl borate, triethanolamine borate. From the standpoints of easy availability, and safety or storage stability of the compound, trimethyl borate, triethyl borate, tri-n-propyl borate, triisopropyl borate and tri-n-butyl borate are preferable, while triethyl borate and triisopropyl borate are more preferable, and triethyl borate is particularly preferable.

The titanic acid esters include, for example, tetraethyl titanate, tetrapropyl titanate, tetraisopropyl titanate, tetrabutyl titanate, tetraoctyl titanate. From the standpoint of storage stability, tetraethyl titanate, tetrapropyl titanate and tetraisopropyl titanate are preferable, and tetraethyl titanate is more preferable.

The aluminate compound includes, for example, triethyl aluminate, tripropyl aluminate, triisopropyl aluminate, tributyl aluminate, trioctyl aluminate.

The zirconate compound includes, for example, tetraethyl zirconate, tetrapropyl zirconate, tetraisopropyl zirconate, tetrabutyl zirconate.

From the standpoints of excellent general versatility, high safety and excellent storage stability, boric acid esters are preferable, and triethyl borate is particularly preferable.

The addition amount of the constituent (4) is 0.3 to 2.0 parts by weight per 100 parts by weight of the constituent (1) in the composition. When less than 0.3 parts by weight is used, there is the case that sufficient storage stability is not obtained, and when more than 2.0 parts by weight is used, deterioration of curing properties is large. From the standpoint that curing properties and storage stability are high, 0.5 to 1.5 parts by weight is preferable.

As a production method of the composition of the present invention includes uniformly mixing the respective components at low temperature to an extent such that a polymerization reaction does not proceed, under the condition that thermal history does not undergo. Mixing order is preferably that the constituent (1) is added last.

In particular, a reproducible and practical one-component epoxy resin composition can be produced by the following steps.

Step 1. A step of mixing constituent (3) with constituent (2), and heat dissolving until becoming a uniform solution.

Step 2. A step of, after standing to cool, adding constituent (4) and constituent (1), and mixing.

The step of heat dissolving in the step 1 varies depending on the kind of constituent (3) employed. Where constituent (3) is a urea compound, 40° C. is generally the lower limit temperature. From the standpoint of completing uniform dissolution in a short period of time, 60° C. is preferable, 70° C. is more preferable, and 80° C. is particularly preferable. The upper limit temperature is generally 150° C. From the standpoint of decomposition temperature or lower, 120° C. is preferable, 100° C. is more preferable, and 90° C. is particularly preferable.

Where composition (3) is an amineimide compound, 20° C. is generally the lower limit 30 temperature. From the standpoint of completing uniform dissolution in a short period of time, 30° C. is preferable, 50° C. is more preferable, and 70° C. is particularly preferable. The upper limit temperature is generally 150° C. From the standpoint of decomposition temperature or lower, 120° C. is preferable, 100° C. is more preferable, and 90° C. is particularly preferable.

The heating time for step 1 is not particularly limited so long as it is sufficient to dissolve constituent (3), and is generally selected in a range of from 5 minutes to 5 hours. From the standpoints that thermal history does not undergo and production time does not project, 10 minutes to 2 hours is preferable, and 15 minutes to 1 hour is more preferable.

The mixing apparatus for producing the composition of the present invention is not particularly limited, and can be a general stirring apparatus. When constituent (3) does not completely dissolve, complete dissolution may be achieved by adding other components such as an organic solvent and diluent, in an amount that would not impair the advantage of the present invention.

The method of curing the one-component epoxy resin composition of the invention is not particularly limited, and uses an appropriate method depending on the field used. For example, a hot air circulation oven, an infrared heater, a heating gun, a high frequency induction heating apparatus, heating by pressure bonding a heat tool, and the like can be used.

Conditions of curing the one-component epoxy resin composition of the present invention are divided into low temperature and long time curing, and high temperature and short time curing, depending on the use kind and the use purpose, and the respective preferable temperature region and time can be selected. For example, in the case that a plastic material such as polyvinyl chloride or ABS resin is used in parts to which a one-component epoxy resin composition is applied, or in the case of precision machine parts requiring dimensional accuracy, it is preferable to cure at low temperature. Therefore, 60 to 120° C. is generally used. At temperature lower than 60° C., very long curing time is required, and at temperature higher than 120° C., disadvantages such as deformation of parts and deterioration of a material cause. From the standpoint of easy workability, 60 to 100° C. is further preferable.

Further, when applying the one-component epoxy resin composition of the present invention to parts having relatively high heat resistance, curing can be performed in further short period of time by heating to high temperature when curing. Therefore, from the point of productivity, preferably 120 to 350° C. is generally used. At temperature lower than 120° C., time is too long, and at temperature higher than 350° C., the cured composition chemically decomposes and deteriorates, or thermal stress by curing increases, resulting in deterioration of adhesion between the composition and a material to be adhered. From the standpoint of easy workability, 120 to 250° C. is preferable and 120 to 200° C. is further preferable.

To the epoxy resin composition of the present invention, various additives used in this field, such as a filler, a diluent, a solvent, a pigment, a flexibility imparting agent, a coupling agent and an antioxidant, can be added in an extent that would not impair the advantage of the present invention.

The one-component epoxy resin composition of the present invention has excellent curing properties and storage stability, and therefore can be used as various functional products. Mainly, it is useful in uses as adhesives, sealing agents and casting agents, and also because of the coating film being uniform at the time of coating, uses as coating materials and paints. In particular, from the standpoint that it is penetrated in narrow spaces and cured, it is particularly useful in "coil impregnation sealing" uses in which it is impregnated in densely wound coils and sealed, in motors, transformation parts and the like, or "relay impregnation sealing" uses that seal spaces of part cases in relay parts and the like. Further, in fabrication of precision parts such as a spindle motor part of a hard disc drive, and the like, it can be utilized to uses in which the present composition is impregnated in spaces of set parts to adhere. As paints and coating materials, it can be utilized to insulating paints of printed wiring boards, moisture-proof coats of various electronic parts, and the like.

The above written description of the invention provides a manner and process of making and using it such that any person skilled in this art is enabled to make and use the same, this enablement being provided in particular for the subject matter of the appended claims, which make up a part of the original description.

As used above, the phrases "selected from the group consisting of," "chosen from," and the like include mixtures of the specified materials.

Where a numerical limit or range is stated herein, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Having generally described this invention, a further understanding can be obtained by reference to certain specific examples, which are provided herein for purposes of illustration only, and are not intended to be limiting unless otherwise specified.

EXAMPLES

Abbreviations of raw materials used in the Examples and Comparative Examples are as follows.
(1) Epoxy resin
   EP-828 (trade name, Yuka Shell Epoxy Co.); Bisphenol A epoxy resin, epoxy equivalent 184-194
(2) Polythiol compound
   TMTP (trade name, Yodo Kagaku Co., Ltd.); Trimethylol propane tris($\beta$-thiopropionate)
(3) Solid dispersion curing accelerator:
   AMICURE PN-23 (trade name, Ajinomoto Fine Techno Co., Inc.)

Production Example 1

20.26 g (0.20 mol) of dipropyl amine and 100 mL of toluene were placed in a 500 mL three-necked flask equipped with a dropping funnel and Dimroth condenser. While stirring, 24.02 g (0.20 mol) of phenyl isocyanate was gradually added dropwise while paying particular attention to generation of heat. After completion of the dropwise addition, stirring was conducted for 3 hours. The precipitate formed was filtered off by suction filtration. The filter mass obtained was washed with 100 mL of n-hexane, and then dried under heating at 80° C. and reduced pressure to obtain 43.45 g (yield 99%) of N,N-propyl-N'-phenyl urea.

Production Example 2

42.13 g of N,N-diallyl-N'-phenyl urea was obtained in the same manner as in Production Example 1, with the exception of the substitution of 19.45 g of diallyl amine in place of the dipropyl amine.

Production Example 3

119.97 g of N,N-dibutyl-N'-phenyl urea was obtained in the same manner as in Production Example 1, with the exception of the substitution of 64.60 g of dibutyl amine in place of the dipropyl amine.

Production Example 4

38.00 g of N,N-1,4-butanediyl-N'-phenyl urea was obtained in the same manner as in Production Example 1, with the exception of the substitution of 14.24 g of pyrrolidine in place of the dipropyl amine.

Production Example 5

38.13 g of N,N-1,5-pentanediyl-N'-phenyl urea was obtained in the same manner as in Production Example 1, with the exception of the substitution of 17.07 g of piperidine in place of the dipropyl amine.

Production Example 6

30.49 g of N,N-(4-methyl-1,3-phenylene)bis(pyrrolidine-1-carboxamide) was obtained in the same manner as in Production Example 1, with the exception of the substitution of 14.25 g of pyrrolidine in place of the dipropyl amine and the substitution of 2,4-toluylene diisocyanate in place of phenyl isocyanate.

Production Example 7

23.64 g (0.20 mol) of methyl 2-hydroxyisobutyrate, 30.03 g (0.30 mol) of phenylglycidyl ether and 20 mL of 2-propanol were placed in a 500 mL three-necked flask equipped with a dropping funnel and Dimroth condenser. While stirring at room temperature, 12.04 g (0.20 mol) of 1,1-dimethyl hydrazine was gradually added dropwise. After completion of the dropwise addition, stirring was conducted for 24 hours and a solvent was removed by distillation followed by drying under reduced pressure to produce 59.27 g of amineamide.

Evaluation Method

Storage Stability Test 20 g of an epoxy resin composition was placed in a 50 cc volume glass-made sample bottle, the bottle was placed in a thermostatic chamber set to 25° C., and days until the loss of fluidity was measured. 35 days or more was indicated as "◯◯", 20 to 34 days was indicated as "◯", 10 to 19 days was indicated as "Δ", 4 to 9 days was indicated as "▲", and 3 days or less was indicated as "X".

Appearance Test of Adhesive 20 g of an epoxy resin composition was placed in a 50 cc volume glass-made sample bottle, and was visually confirmed. A transparent composition was indicated as "◯", and an opaque composition was indicated as "X".

Impregnating Adhesion Test

A surface of a test piece of a soft steel plate (JIS G3141, SPCCD) was polished with an endless belt (JIS #120). As a result of measuring irregularities on the polished surface with a three-dimensional interference microscope (Wyko NT3300, a product of Veeco Metrology), depth of polishing was from 3 to 8 µm on one surface. The polished surfaces were stuck in an overlap of 12 mm using two clips, and pressed. Each composition of the Examples and Comparative Examples was applied to one edge of the laminated test pieces in about 3 mm thickness, the laminate was stood obliquely in an oven, and the laminate was adhered by heat curing at 150° C. for 30 minutes in a state that the adhesive is easy to impregnate in the laminated portion. The steel plates after curing were separated, and the adhered surface was observed. An adhered surface free from tack and being uniformly cured was indicated as "◯", an adhered surface having cured portion and uncured portion, and showing curing unevenness was indicated as "Δ", and an adhered surface being uncured and having tack remained was indicated as "X".

Thin Film Curing Test

A bar coater was set in a thickness of 20 µm on the steel plate polished in the same manner as in the above impregnating adhesion test, and a composition was applied. The coating film applied was heated at 150° C. for 30 minutes to cure. Coating film thickness after curing was from 10 to 20 µm. A cured coating film being uniform was indicated as "◯", a cured coating film having unevenness was indicated as "Δ", and a cured coating film being non-uniform and rough was indicated as "X".

Example 1

74 parts by weight of TMTP and 5 parts by weight of the urea compound shown in Production Example 1 were placed in a plastic vessel, and heated at 80° C. for 30 minutes in a hot air circulation oven to obtain a transparent solution. After cooling to room temperature, 100 parts by weight of EP-828 and 0.7 parts by weight of triethyl borate were mixed therein to obtain a transparent and homogeneous epoxy resin composition.

Examples 2 to 8 and Comparative Examples 1 to 7

Epoxy resin compositions of Examples 2 to 8 and Comparative Examples 1 to 7 were obtained in the same manner as in Example 1 according to the formulations shown in Tables 1 and 2 shown hereinafter. The numerical values showing the compounding amount of raw materials in Tables 1 and 2 indicate parts by weight.

Comparative Example 8

74 parts by weight of TMTP, 2 parts by weight of AMICURE PN-23 (trade name, a product of Ajinomoto Fine Techno Co, Inc.), 100 parts by weight of EP-828 and 0.7 parts by weight of triethyl borate were placed in a plastic vessel. After premixing, the mixture was kneaded with a roll mixer to obtain a milky white, opaque epoxy resin composition.

Comparative Example 9 (corresponding to Example 1 (a) described in the specification of U.S. Pat. No. 3,367,532)

74 parts by weight of TMTP and 5 parts by weight of the urea compound shown in Production Example 3 were placed in a plastic vessel. After stirring at room temperature for 10 minutes, 100 parts by weight of EP-828 was added, and further stirred at room temperature for 5 minutes. As a result, undissolved residue of the urea compound was confirmed. Curing was insufficient in both the impregnating adhesion test and the thin film curing test (see Tables 1 and 2 below).

Results

The epoxy resin compositions prepared above were subjected to 4 kinds of tests of storage stability, appearance of adhesive, impregnating adhesion and thin film curing properties by the above methods, and evaluations were made. The composition of the compositions of Examples 1 to 8 and Comparative Examples 1 to 9 and the evaluation test results are summarized in Table 1 and Table 2 below.

TABLE 1

(Invention)

| | | Example 1 | Example 2 | Example 3 | Example 4 | Example 5 | Example 6 | Example 7 | Example 8 |
|---|---|---|---|---|---|---|---|---|---|
| Constituent (1) | EP-828 | 100 | 100 | 100 | 100 | 100 | 100 | 100 | 100 |
| Constituent (2) | TMTP | 74 | 74 | 74 | 74 | 74 | 74 | 74 | 74 |
| Constituent (3) | Production Example 1 | 5 | | | | | | | 5 |
| | Production Example 2 | | 5 | | | | | | |
| | Production Example 3 | | | 5 | | | | | |
| | Production Example 4 | | | | 5 | | | | |
| | Production Example 5 | | | | | 2 | | | |
| | Production Example 6 | | | | | | 4 | | |
| | Production Example 7 | | | | | | | 4 | |
| | AMICURE PN-23 | | | | | | | | |
| Constituent (4) | Triethyl Borate | 0.7 | 0.7 | 0.7 | 0.7 | 0.7 | 0.7 | 0.7 | |
| | Triethyl titanate | | | | | | | | 1 |
| Appearance of adhesive | | ○ (Transparent) | ○ (Transparent) | ○ (Transparent) | ○ (Transparent) | ○ (Transparent) | ○ (Transparent) | ○ (Transparent) | ○ (Transparent) |
| Storage stability (25° C. · day) | | ○○(27) | ○○(62) | ○(27) | ○○(71) | ○(21) | ○○(39) | ▲(4) | Δ(14) |
| Impregnating adhesion | | ○ | ○ | ○ | ○ | ○ | ○ | ○ | ○ |
| Thin film curing Properties | | ○ | ○ | ○ | ○ | ○ | ○ | ○ | ○ |

TABLE 2

(Comparative Example)

| | | Comparative Example 1 | Comparative Example 2 | Comparative Example 4 | Comparative Example 5 | Comparative Example 6 | Comparative Example 7 | Comparative Example 8 | Comparative Example 9 |
|---|---|---|---|---|---|---|---|---|---|
| Constituent (1) | EP-828 | 100 | 100 | 100 | 100 | 100 | 100 | 100 | 100 |
| Constituent (2) | TMTP | 74 | 74 | 74 | 74 | 74 | 74 | 74 | 74 |

TABLE 2-continued (Comparative Example)

| | | Comparative Example 1 | Comparative Example 2 | Comparative Example 4 | Comparative Example 5 | Comparative Example 6 | Comparative Example 7 | Comparative Example 8 | Comparative Example 9 |
|---|---|---|---|---|---|---|---|---|---|
| Constituent (3) | Production Example 1 | 5 | | | | | | | |
| | Production Example 2 | | 5 | | | | | | |
| | Production Example 3 | | | | | | | | 5 |
| | Production Example 4 | | | 5 | | | | | |
| | Production Example 5 | | | | 2 | | | | |
| | Production Example 6 | | | | | 4 | | | |
| | Production Example 7 | | | | | | 4 | | |
| | AMICURE PN-23 | | | | | | | 2 | |
| Constituent (4) | Triethyl Borate | | | | | | | | |
| | Triethyl titanate | | | | | | | | |
| Appearance of Adhesive | | ○ (Transparent) | ○ (Transparent) | ○ (Transparent) | ○ (Transparent) | ○ (Transparent) | ○ (Transparent) | X (Milky white opaque) | X (Undissolved residue of accelerator) |
| Storage stability (25° C. · day) | | ▲(5) | Δ(15) | ▲(8) | X(1) | ▲(6) | X(1) | — | — |
| Impregnating adhesion | | ○ | ○ | ○ | ○ | ○ | ○ | X(*1) | Δ(*1) |
| Thin film curing Properties | | ○ | ○ | ○ | ○ | ○ | ○ | X(*1) | Δ(*1) |

As a result, the compositions of Comparative Examples 1 to 6 had adhesive properties, but storage stability showed "Δ" to "X". Further, the composition of Comparative Example 8 has a composition of the typical solid dispersion one-component epoxy resin, but it was observed that appearance of the adhesive was not transparent, and it was a state that solids are dispersed. In the impregnating adhesion test, the impregnated portion was uncured, tack remained, and it was confirmed that the composition does not cure in narrow spaces. Further, it was confirmed that roughness was similarly present on the coating film also in the thin film curing test.

On the other hand, the compositions of Examples 1 to 6 were that appearance of all the adhesives is transparent and uniform, and the storage stability is markedly prolonged as compared with the corresponding Comparative Examples and shows "○" to "○○", thus showing very good storage stability. Further, in the impregnating adhesion test, it was confirmed that the adhering surface does not have tack, and is uniformly cured, and in the thin film curing test, it was confirmed that the coating film is uniform. More particularly, it was revealed to be a completely liquid one-component epoxy resin composition provided with both good storage stability and curing properties.

In the composition of Example 7, which is a representative example of a case of using amineimide as the constituent (3), although the storage stability was "▲" remarkable improvement of storage stability was achieved by the effect of the constituent (4) as compared with Comparative Example 7. Further, in the composition of Example 8, which is a representative example of the case of using a titanate as the constituent (4), improvement of the storage stability was achieved as compared with Comparative Example 1. The appearance of each adhesive is transparent and uniform, and further, in the impregnating adhesion test, it was confirmed that the adhering surface does not have tack and is uniformly cured, while in the thin film curing test it was confirmed that the coating film is uniform. Specifically, it was first shown that even in the case of using amineimide as the constituent (3) (Example 7), and further, the case of using triethyl titanate as the constituent (4) (Example 8), a completely liquid one-component epoxy resin composition having both almost good storage stability and curing properties is obtained.

The composition of Comparative Example 9 had an undissolved residue of the urea compound. Also curing of this composition was insufficient in both the impregnating adhesion test and the thin film curing test.

Formulation Example 1 (Adhesive)

| | |
|---|---|
| Epoxy resin composition (Example 1) | 179 parts by weight |
| Silane coupling agent KBM-403 (a product of Shin-Etsu Silicone Co.) | 1 part by weight |

When an adhesive was produced with the above formulation amount, it was revealed to be the adhesive showing sufficient adhesive strength even in narrow portions, and also provided with both good curing properties and storage stability.

Formulation Example 2 (Paint)

| | |
|---|---|
| Epoxy resin composition (Example 2) | 100 parts by weight |
| Carbon black FW200 (a product of Degussa AG) | 5 parts by weight |
| Dispersant AJISPER PB821 (a product of Ajinomoto Fine Techno Co., Inc.) | 2 parts by weight |

When a paint was produced with the above formulation amount, it was revealed to be the paint having smooth surface, free from solid particles of 1 micron or more, and having excellent penetrability into narrow portions.

Based on the foregoing, the one-component epoxy resin composition of the present invention has the characteristics that a curing agent and an epoxy resin are completely mixed in molecular level; it uniformly penetrates even in any narrow spaces so long as a liquid composition can penetrate, and can cure; and the storage stability is durable to practical use. Therefore, the composition of the present invention can be utilized in wide array uses as various functional products such as adhesives, casting agents, sealants, encapsulants, coating materials, paints and the like. Further the field of application of the composition of the present invention covers a broad range, including electric and electronic parts, automobile parts and the like.

Numerous modifications and variations on the present invention are possible in light of the above teachings. It is, therefore, to be understood that within the scope of the accompanying claims, the invention may be practiced otherwise than as specifically described herein.

The invention claimed is:

1. A method of making a completely liquid one-component epoxy resin composition, which is homogeneous at room temperature, said method comprising:
(a) mixing a compound that releases a basic component under a curing temperature condition with a polythiol compound having 2 or more thiol groups in the molecule, wherein said compound that releases a basic component under a curing temperature condition is soluble in said polythiol compound having 2 or more thiol groups in the molecule, to obtain a mixture;
(b) heating said mixture, to obtain a uniform solution;
(c) cooling said uniform solution, to obtain a cooled solution;
(d) adding a compound having Lewis acidity and an epoxy resin having 2 or more epoxy groups in the molecule to said cooled solution, to obtain said completely liquid one-component epoxy resin composition.

2. The method of claim 1, wherein said compound that releases a basic component under a curing temperature condition is a urea compound.

3. The method of claim 2, wherein said urea compound is a compound obtained by a reaction of a compound having one or more isocyanate groups in the molecule and a compound having at least one primary and/or secondary amino group in the molecule.

4. The method of claim 3, wherein said compound having one or more isocyanate groups in the molecule is an aromatic isocyanate.

5. The method of claim 3, wherein said compound having one or more isocyanate groups in the molecule is selected from the group consisting of phenyl isocyanate, 2,4-toluylene diisocyanate, 2,6-toluylene diisocyanate, diphenyl methane-4,4'-diisocyanate.

6. The method of claim 3, wherein said compound having one or more isocyanate groups in the molecule is selected from the group consisting of phenyl isocyanate and 2,4-toluylene diisocyanate.

7. The method of claim 2, wherein said urea compound is a compound obtained by a reaction of a compound having one or more isocyanate groups in the molecule and a compound having at least one secondary amino group in the molecule.

8. The method of claim 7, wherein said compound having at least one secondary amino group in the molecule has a cyclic structure.

9. The method of claim 7, wherein said compound having at least one secondary amino group in the molecule has a structure such that a substituent containing 2 or more carbon atoms is bonded to nitrogen atom.

10. The method of claim 7, wherein said compound having at least one secondary amino group in the molecule is selected from the group consisting of diethylamine, diisopropylamine, dibutylamine, piperidine, and pyrrolidine.

11. The method of claim 7, wherein said compound having at least one secondary amino group in the molecule is selected from the group consisting of piperidine and pyrrolidine.

12. The method of claim 7, wherein said compound having at least one secondary amino group in the molecule is pyrrolidine.

13. The method of claim 1, wherein said compound that releases a basic component under a curing temperature condition is an amineimide compound.

14. The method of claim 13, wherein said amineimide compound is a compound represented by formula (1):

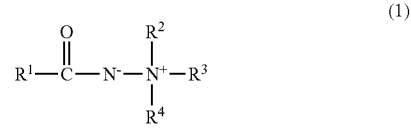

wherein $R^1$ represents an alkyl group which may have one or more substituents or an aryl group which may have one or more substituents, and $R^2$, $R^3$ and $R^4$ each independently represent an alkyl group which may have one or more substituents.

15. The method of claim 1, wherein said compound that releases a basic component under a curing temperature condition is present in an amount ranging from 0.5 to 30 parts by weight per 100 parts by weight of said epoxy resin having 2 or more epoxy groups in the molecule.

16. The method of claim 1, wherein said compound having Lewis acidity is a boric acid ester.

17. The method of claim 16, wherein said boric acid ester is selected from the group consisting of trimethyl borate, triethyl borate, tri-n-propyl borate, triisopropyl borate and tri-n-butyl borate.

18. The method of claim 1, wherein said compound having Lewis acidity is a titanic acid ester compound.

19. The method of claim 18, wherein said titanic acid ester is selected from the group consisting of tetraethyl titanate, tetrapropyl titanate and tetraisopropyl titanate.

20. The method of claim 1, wherein said compound having Lewis acidity is present in an amount ranging from 0.3 to 2.0 parts by weight per 100 parts by weight of said epoxy resin having 2 or more epoxy groups in the molecule.

21. The method of claim 1, wherein said epoxy resin having 2 or more epoxy groups in the molecule is selected from the group consisting of a polyglycidyl ether, a glycidyl ether ester, a polyglycidyl ester, an epoxidized phenol novolac resin, an epoxidized cresol novolac resin, an epoxidized polyolefin, an alicyclic epoxy resin, and an urethane-modified epoxy resin.

22. The method of claim 1, wherein said epoxy resin having 2 or more epoxy groups in the molecule is a bisphenol-A epoxy resin.

23. The method of claim 1, wherein the mixing ratio of said epoxy resin having 2 or more epoxy groups in the molecule and said polythiol compound having 2 or more thiol groups in the molecule ranges from 0.2 to 1.2 in SH equivalent number/epoxy equivalent number.

24. The method of claim 1, wherein said compound that releases a basic component under a curing temperature condition is a urea compound and said mixture is heated to a temperature ranging from 40° C. to 150° C.

25. The method of claim 1, wherein said compound that releases a basic component under a curing temperature condition is an amineimide compound and said mixture is heated to a temperature ranging from 20° C. to 150° C.

26. The method of claim 1, wherein said mixture is heated for 5 minutes to 5 hours.

27. A method of making a functional product, said method comprising mixing a completely liquid one-component epoxy resin composition obtained by the method of claim 1, with at least one additive selected from the group consisting of a filler, a diluent, a solvent, a pigment, a flexibility imparting agent, and a mixture thereof.

28. The method of claim 27, wherein said at least one additive is at least one filler.

29. The method of claim 28, wherein said at least one filler is carbon black.

* * * * *

UNITED STATES PATENT AND TRADEMARK OFFICE
CERTIFICATE OF CORRECTION

PATENT NO. : 7,479,534 B2
APPLICATION NO. : 11/491118
DATED : January 20, 2009
INVENTOR(S) : Amano et al.

It is certified that error appears in the above-identified patent and that said Letters Patent is hereby corrected as shown below:

On the title page, Inventor: Item (75) should read:

-- (75) Inventors: Hiroshi Amano, Kawasaki (JP); Osamu Yamabe, Kawasaki (JP); Hiroyasu Koto, Kawasaki (JP) --

Signed and Sealed this

Twenty-fourth Day of March, 2009

JOHN DOLL
*Acting Director of the United States Patent and Trademark Office*